US012712317B2

(12) United States Patent
Moore et al.

(10) Patent No.: US 12,712,317 B2
(45) Date of Patent: Aug. 18, 2026

(54) MULTI-CLICK ANTI-BACKOUT ELECTRICAL CONNECTOR ASSEMBLY

(71) Applicant: FORD GLOBAL TECHNOLOGIES, LLC, Dearborn, MI (US)

(72) Inventors: Richard Moore, Fenton, MI (US); Scott Robert Lirette, Royal Oak, MI (US); David Lloyd Nutt, Monroe, MI (US); Joel Allen Pittenger, Rochester Hills, MI (US); John Paul Modzel, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 362 days.

(21) Appl. No.: 18/463,669

(22) Filed: Sep. 8, 2023

(65) Prior Publication Data

US 2025/0087940 A1 Mar. 13, 2025

(51) Int. Cl.

| | |
|---|---|
| ***H01R 13/639*** | (2006.01) |
| ***H01R 13/627*** | (2006.01) |
| ***H01R 13/66*** | (2006.01) |

(52) U.S. Cl.
CPC ....... *H01R 13/639* (2013.01); *H01R 13/6277* (2013.01); *H01R 13/6683* (2013.01)

(58) Field of Classification Search
CPC .............. H01R 13/639; H01R 13/6277; H01R 13/6683; H01R 13/6271
See application file for complete search history.

(56) References Cited

U.S. PATENT DOCUMENTS

| | | | | |
|---|---|---|---|---|
| 3,748,633 | A | 7/1973 | Lundergan | |
| 7,351,088 | B1 | 4/2008 | Qu | |
| 2023/0268693 | A1 * | 8/2023 | Martin | H01R 12/716 439/489 |

FOREIGN PATENT DOCUMENTS

| | | | |
|---|---|---|---|
| CN | 109510015 | A | 3/2019 |
| EP | 1737084 | A2 | 12/2006 |

* cited by examiner

*Primary Examiner* — Joseph Ortega
(74) *Attorney, Agent, or Firm* — Frank Lollo; Brooks Kushman P.C.

(57) ABSTRACT

An electrical receptacle, that receives an electrical plug having a male terminal or a female terminal, includes the other of the male terminal or female terminal and a latch that, responsive to movement of the electrical plug toward the electrical receptacle resulting in movement of the male terminal into the female terminal, rides along serrations of the serrated insert such that the latch and one of the serrations cooperate to resist disengagement of the electrical plug from the electrical receptacle.

19 Claims, 5 Drawing Sheets

MULTI-CLICK ANTI-BACKOUT ELECTRICAL CONNECTOR ASSEMBLY

TECHNICAL FIELD

This disclosure relates to electrical connectors.

BACKGROUND

A manufacturing process may have end-of-line testing that ensures electrical connectors are fully engaged and electrical systems are accordingly functional. After end-of-line testing, however, some electrical connectors may loosen during a shipping process.

SUMMARY

An electrical connection assembly has an electrical plug defining a serrated insert and including a terminal, and an electrical receptacle. The electrical receptacle receives the electrical plug, and includes another terminal and a latch that, responsive to movement of the electrical plug toward the electrical receptacle resulting in movement of the terminal toward the another terminal, rides along serrations of the serrated insert such that the latch and one of the serrations cooperate to resist disengagement of the electrical plug from the electrical receptacle, and an extent to which the latch has ridden along the serrated insert corresponds to an extent to which the terminal and another terminal are engaged with each other.

An electrical connection assembly has an electrical plug including a male terminal or a female terminal, and defining a plug body and a serrated insert cantilevered from the plug body, and an electrical receptacle including the other of male terminal or female terminal, and defining a receptacle body that receives the plug body and a latch that, responsive to movement of the plug body into the receptacle body, rides along serrations of the serrated insert such that an extent to which the latch has ridden along the serrated insert corresponds to an extent to which the male terminal is disposed within the female terminal.

An electrical connection assembly has an electrical plug including a male terminal or a female terminal, and defining a recessed portion and a serrated insert disposed within and extending away from the recessed portion, and an electrical receptacle including the other of the male terminal or female terminal, and defining a plurality of latches disposed circumferentially about a center axis of the electrical receptacle such that, when the electrical plug is inserted into the electrical receptacle resulting in connection between the male terminal and female terminal, the latches surround and engage the serrated insert.

DETAILED DESCRIPTION

Figure 1:
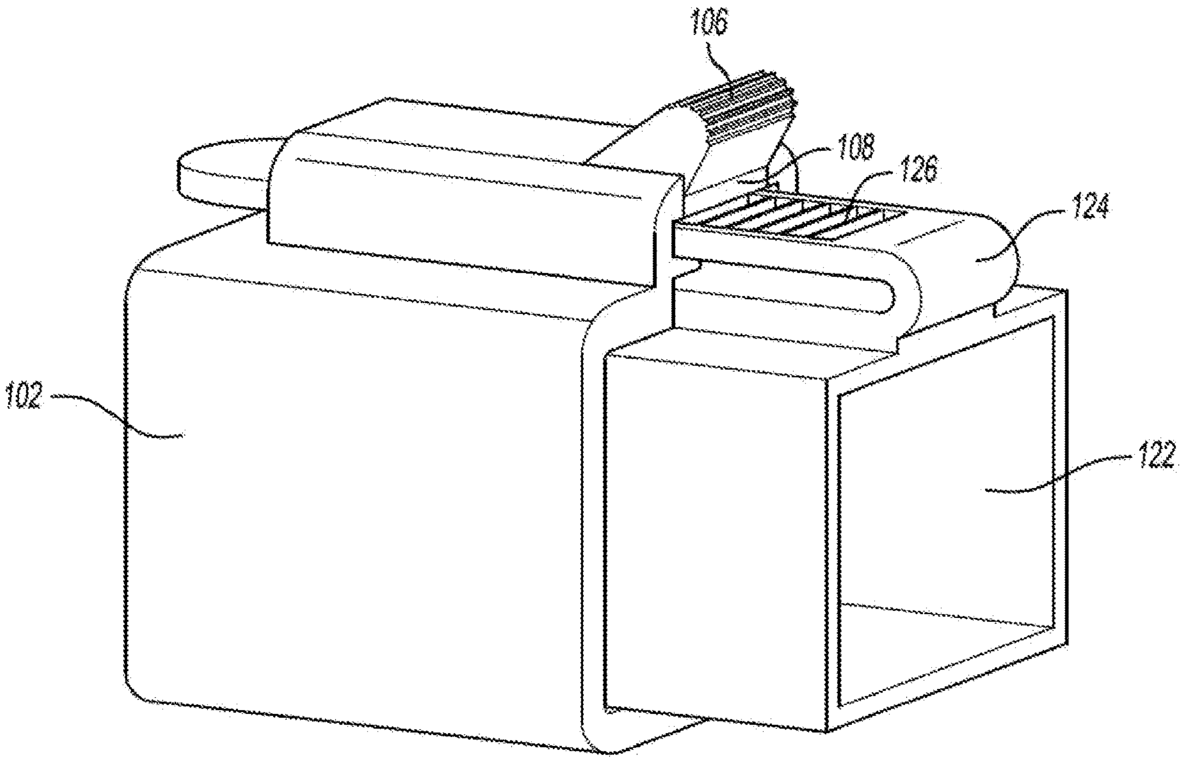
FIG. 1 shows an embodiment wherein a connector assembly includes a single serrated insert and a single latch.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Automotive electrical connectors may facilitate the transmission of electrical signals and power between different systems. These connectors are often designed and constructed to withstand certain environmental conditions such as temperature fluctuations, moisture, etc. A typical automotive electrical connector assembly includes male and female terminals (e.g., pins and sockets, blades and female blade connectors, etc.), which fit snugly to establish an electrical connection. The terminals are often made from materials such as copper alloy to promote conductivity and resist corrosion.

Various types of automotive electrical connectors are available, each serving specific purposes. Some common types include blade or spade connectors, bullet connectors, and multi-pin connectors. Blade connectors, resembling flat metal blades, are widely used for connecting wires to fuses and relays. Bullet connectors, with a bullet-shaped design, are often found in low-current applications, like motorcycle wiring harnesses. Multi-pin connectors allow multiple wires to be connected simultaneously.

Certain advancements in automotive electrical connectors have been driven by the need for higher data transfer rates and increased power handling capacity. The emergence of electric and hybrid vehicles, for example, has necessitated connectors capable of handling higher voltages and currents. Additionally, the growing demand for infotainment and telematics systems has led to the development of connectors that support high-speed data transmission.

As electric and autonomous vehicles become more prevalent, the demand for high-power connectors capable of handling rapid charging and high currents has surged. The development of connectors that support fast-charging infrastructure has been instrumental in promoting electric vehicle adoption.

A manufacturing process may have end-of-line testing that ensures electrical connectors are fully engaged and electrical systems are accordingly functional. As mentioned previously, shipping may loosen some electrical connectors after end-of-line testing.

Electrical connectors as disclosed here may vibrate loose less often than other electrical connectors. The geometries of the electrical connectors disclosed may ensure that vibrations tighten the connection between an electrical plug, one side of an electrical connection, and an electrical receptacle, another side of the electrical connection.

Known structures for ensuring an established electrical connection may include connector position assurance ("CPA") connectors and various configurations of single-latch connectors. Many known structures may ensure an established electrical connection by providing an audible "click" when a connection is established or by providing a resistive obstacle to a loosening vibration. The electrical connector disclosed here may provide multiple clicks while a connection is being established and may provide a resistive obstacle to a loosening vibration with at least one backup serration.

Additional technologies known to be used for ensuring an established electrical connection may include machine vision systems external to an electrical connection or electronic connection detection circuitry internal or interconnected with the electrical connection. Utilizing electronic connection detection circuitry with the electrical connector disclosed here may provide a connection with lower probability of loosening.

FIG. 1 shows an embodiment wherein a connector assembly includes a single serrated insert and a single latch. FIG. 1 shows an electrical receptacle 102 connecting to an electrical plug 122. Respective bodies of the electrical receptacle 102 and electrical plug are rectangularly shaped. The electrical receptacle 102 includes a latch 108 and a tab 106 to lift the latch 108. The electrical plug 122 includes a serrated insert 124 cantilevered from a body of the electrical receptacle 102 and with serrations 126 configured so the latch 108 rides along the serrations 126 during insertion of the electrical plug 122 into the electrical receptacle 102. The embodiment of FIG. 1 includes one latch 108 and one serrated insert 124. Other embodiments can include multiple latches and multiple serrated inserts.

Figure 2:
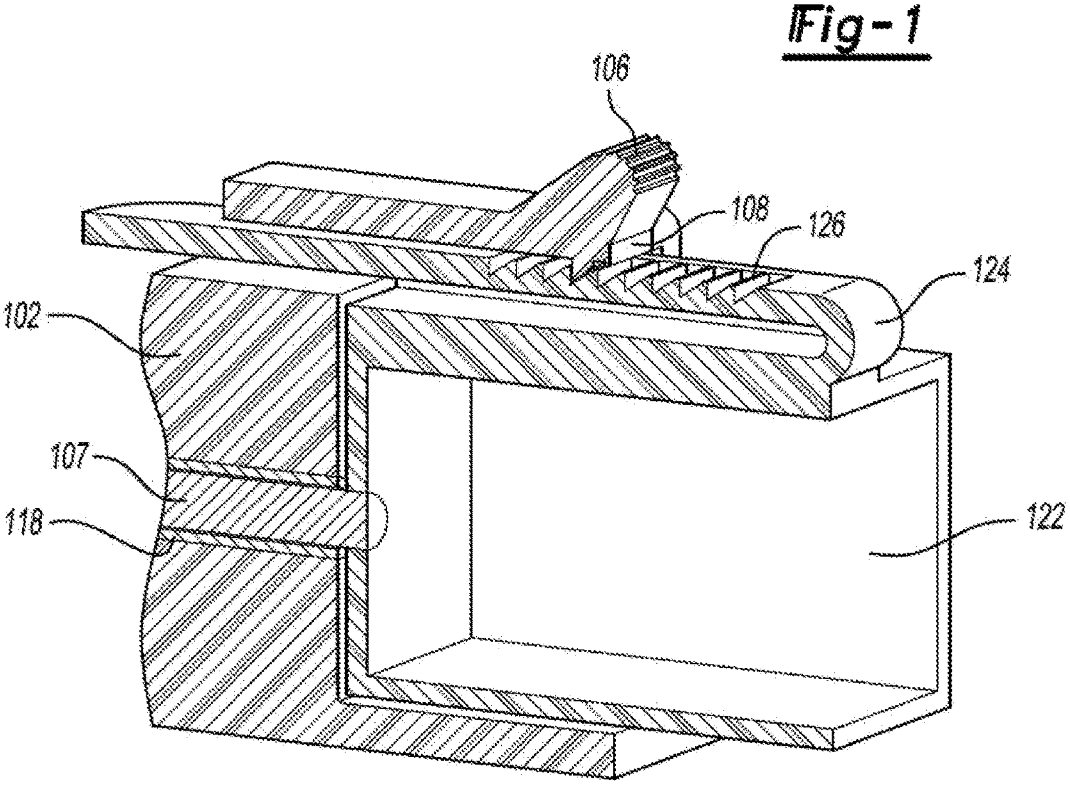
FIG. 2 shows a side-view, in cross-section, of the connector assembly of FIG. 1.

FIG. 2 shows a side-view, in cross-section, of the connector assembly of FIG. 1. FIG. 2 shows the electrical receptacle 102 fully disposed within the electrical plug 122, and as a result an electrical pin 107 is fully disposed within an electrical socket 118. The latch 108 is arranged such that the serrated insert 124 is disposed between a body of the electrical receptacle 102 and latch 108 when the electrical plug 122 is disposed within the electrical receptacle 102. The extent to which the latch 108 rides along the serrations 126 corresponds with the extent to which the electrical pin 107 is disposed within the electrical socket 118. That is, until the electrical pin 107 is fully disposed within the electrical socket 118, the greater the number of serrations 126 the latch 108 has travelled over, the further the electrical pin 107 is disposed within the electrical socket 118.

Figure 3:
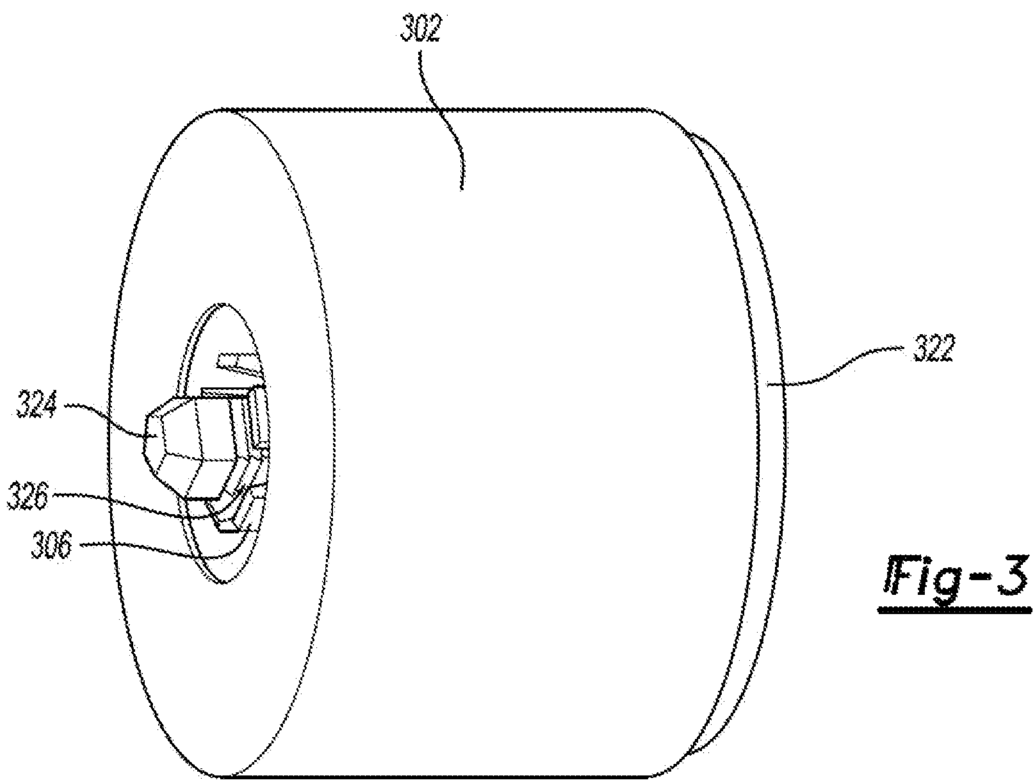
FIG. 3 shows an embodiment wherein a connector assembly includes a single serrated insert and a plurality of latches.

FIG. 3 shows an embodiment wherein a connector assembly includes a single serrated insert and a plurality of latches. FIG. 3 shows an electrical receptacle 302 connecting to an electrical plug 322. The receptacle 302 includes a latch and a tab 306 to lift the latch (not visible in FIG. 3). The electrical plug 322 includes a serrated insert 324 with serrations 326 configured so the latch rides along the serrations 326 during insertion.

Figure 4:
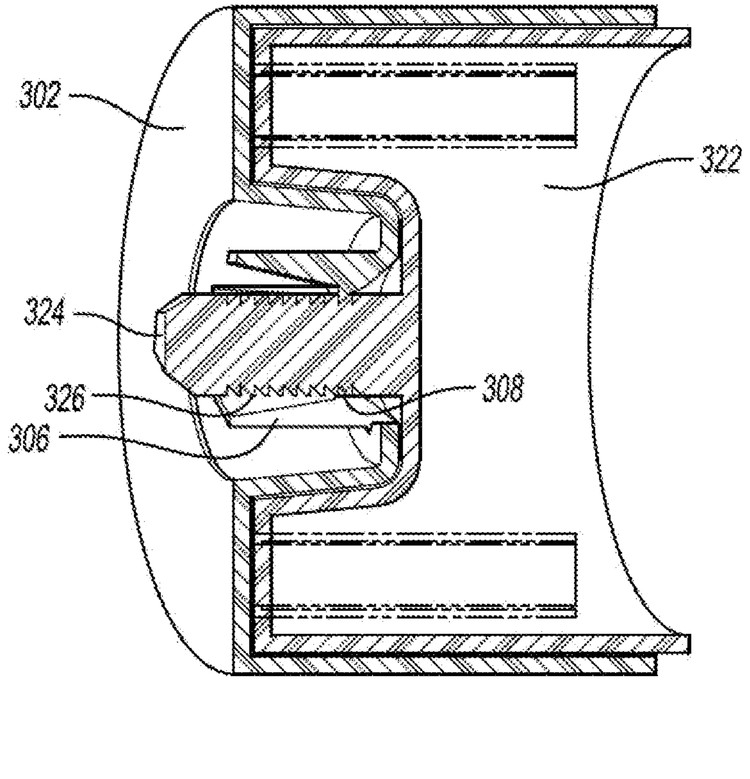
FIG. 4 shows a side-view, in cross-section, of the connector assembly of FIG. 3.

FIG. 4 shows a side-view, in cross-section, of the connector assembly of FIG. 3. FIG. 4 shows the electrical receptacle 302 disposed within the electrical plug 322. The electrical receptacle 302 includes the latch 308 and four other such latches 308 circumferentially disposed about a center axis of the electrical receptacle 302. The latches 308 are disposed within a recess formed by the cylindrical body of the electrical receptacle 302. Similarly, the serrated insert 324 is disposed within and extends away from a recess formed by the complementary cylindrical body of the electrical plug 322. When the latches 308 are engaged with the serrated insert 324, the latches 308 surround the serrated insert 324. Possible locations of associated male and female terminals are shown in phantom line. These locations, as with all embodiments, may be in different or other locations as design requirements and packaging constraints dictate.

Figure 5:
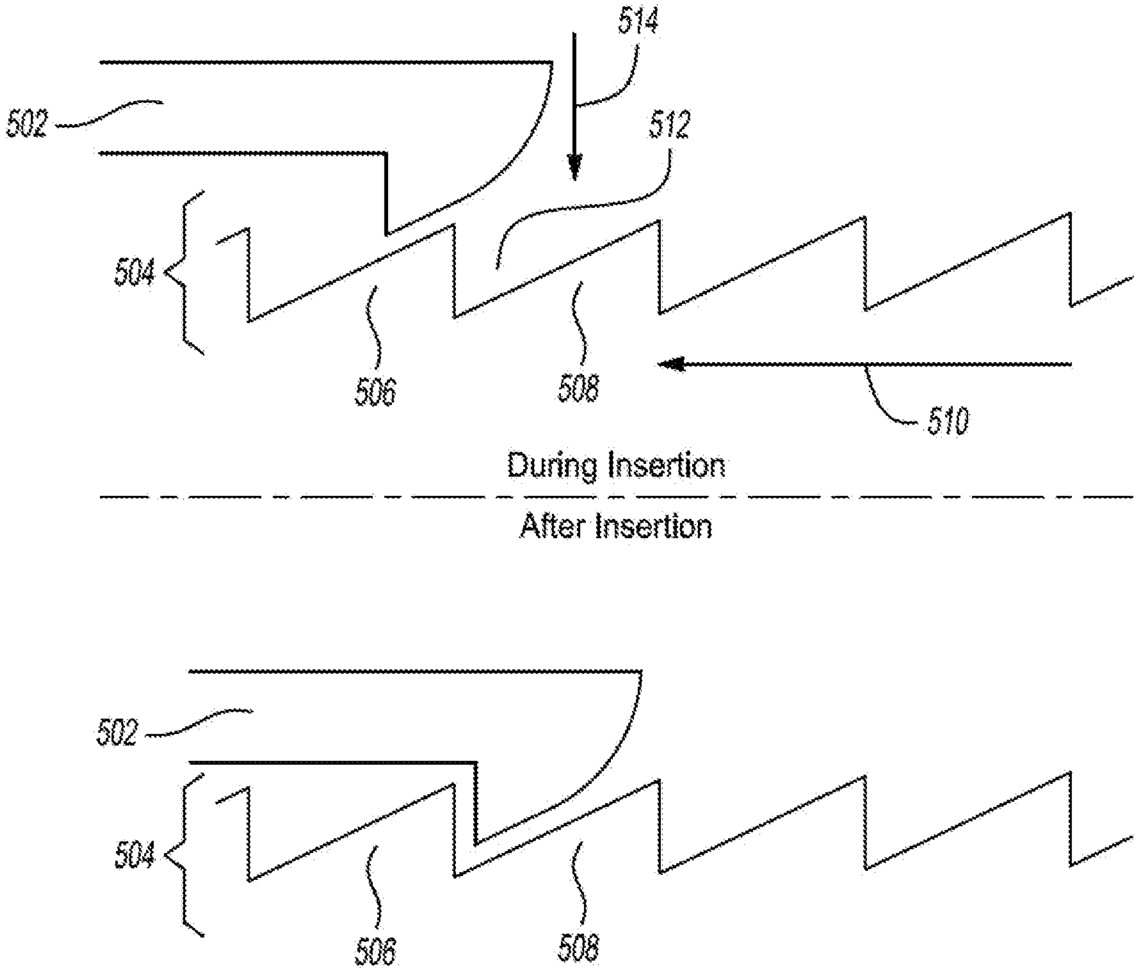
FIG. 5 shows a latch riding along serrations of a serrated insert.

FIG. 5 shows a latch riding along serrations of a serrated insert. FIG. 5 shows a latch 502 riding along a first serration 506 of a serrated insert 504 as the serrated insert 504 moves in an inserting direction 510 during insertion. As the serrated insert 504 moves in the inserting direction 510, the latch 502 is displaced by the first serration 506. When riding along the first serration 506, the latch 502 is configured to generate a force 514 due to latch stiffness for example to keep the latch 502 engaged with the serrated insert 504 during insertion. Thus, when the serrated insert 504 moves further in the inserting direction 510, the latch 502 will enter a space 512 defined by the first serration 506 and a second serration 508 and will ride along the second serration 508.

FIG. 5 also shows the latch 502 engaged with the serrated insert 504 after insertion. The latch 502 as described above rode along the first serration 506 during insertion to enter the space 512 defined by the first serration 506 and the second serration 508. If one of the serrated insert 504 or latch 502 receive a loosening force, the latch 502 and the first serration 506 will cooperate via interference to prevent movement in the direction opposite to the inserting direction 510. That is, the interference between the latch 502 and the first serration 506 can prevent a disconnection of an electrical connection. Further, if the latch 502 and the first serration 506 slip rather than interfere, the latch 502 should catch on another serration of the serrated surface 504 to prevent further relative movement between the latch 502 and serrated insert 504 opposite the inserting direction 510.

Figure 6:
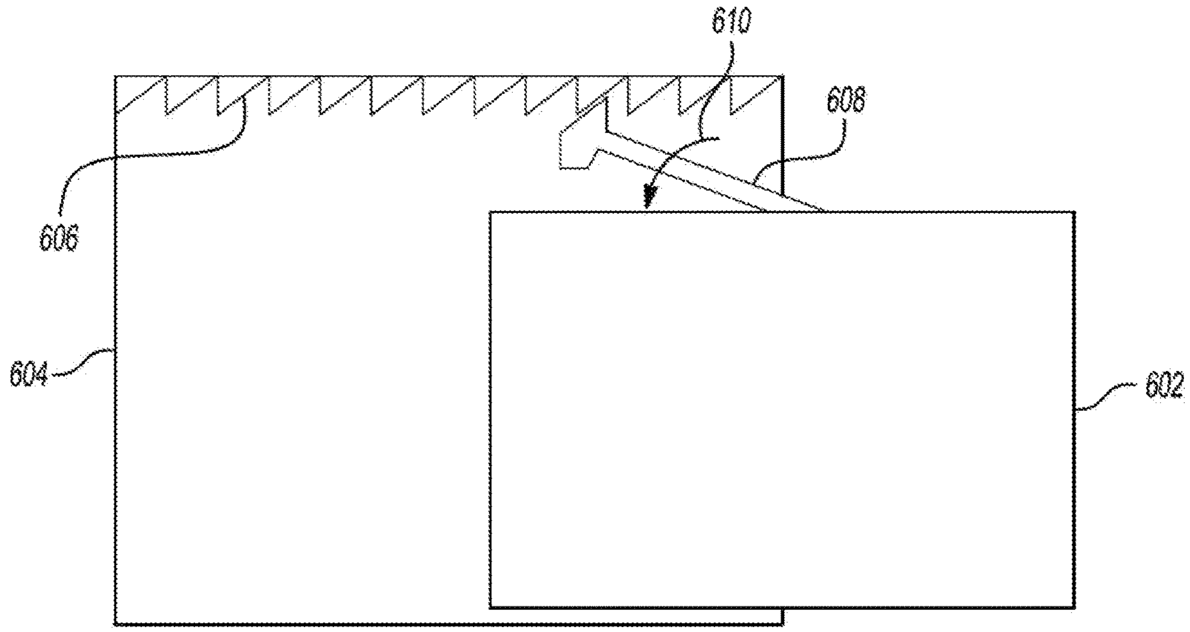
FIGS. 6 and 7 show embodiments wherein an electrical plug includes a latch and an electrical receptacle includes a serrated insert.

FIG. 6 shows an embodiment wherein an electrical plug 602 includes a latch 608 and an electrical receptacle 604 includes a serrated insert 606. The serrated insert 606 and the latch 608 can engage as described previously. A direction of movement 610 is depicted that would disengage the latch 608 from the serrated insert 606. For example, this direction of movement 610 may be achieved by a tool being inserted between the electrical plug 602 and the serrations 606 of the electrical receptacle 604. This embodiment demonstrates, among other things, the interchangeability of the latch and the serrations on a plug and receptacle, respectively.

Figure 7:
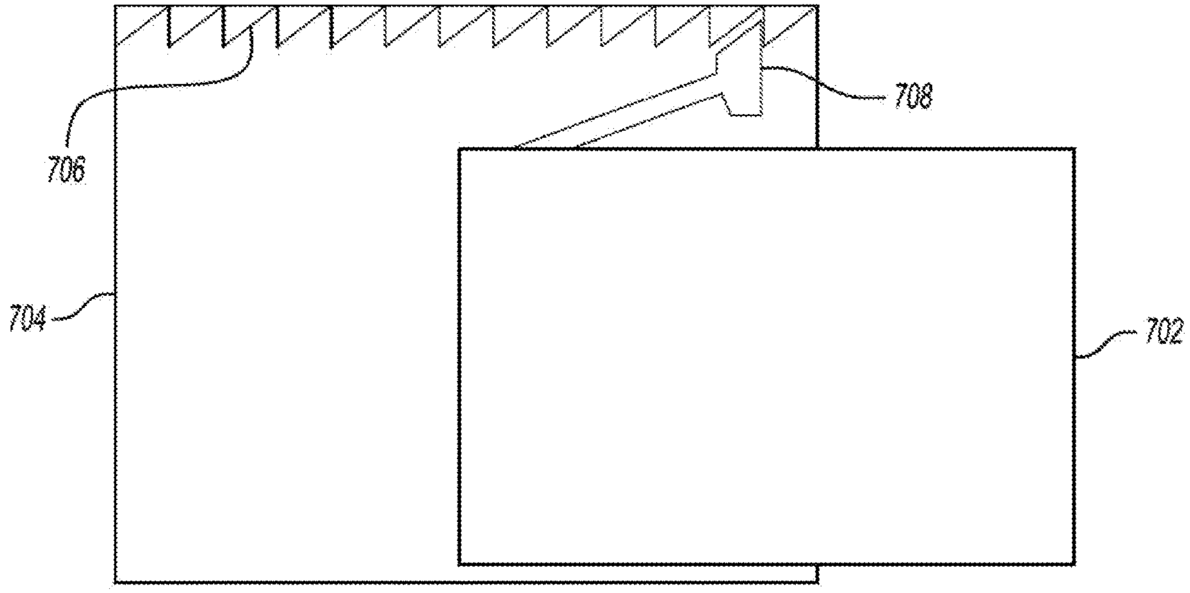

FIG. 7 shows an embodiment wherein an electrical plug 702 includes a latch 708 and an electrical receptacle 704 includes a serrated insert 706 and wherein the latch 708 is cantilevered in a second direction. This embodiment demonstrates, among other things, that the cantilevering can assume multiple orientations.

Figure 8:
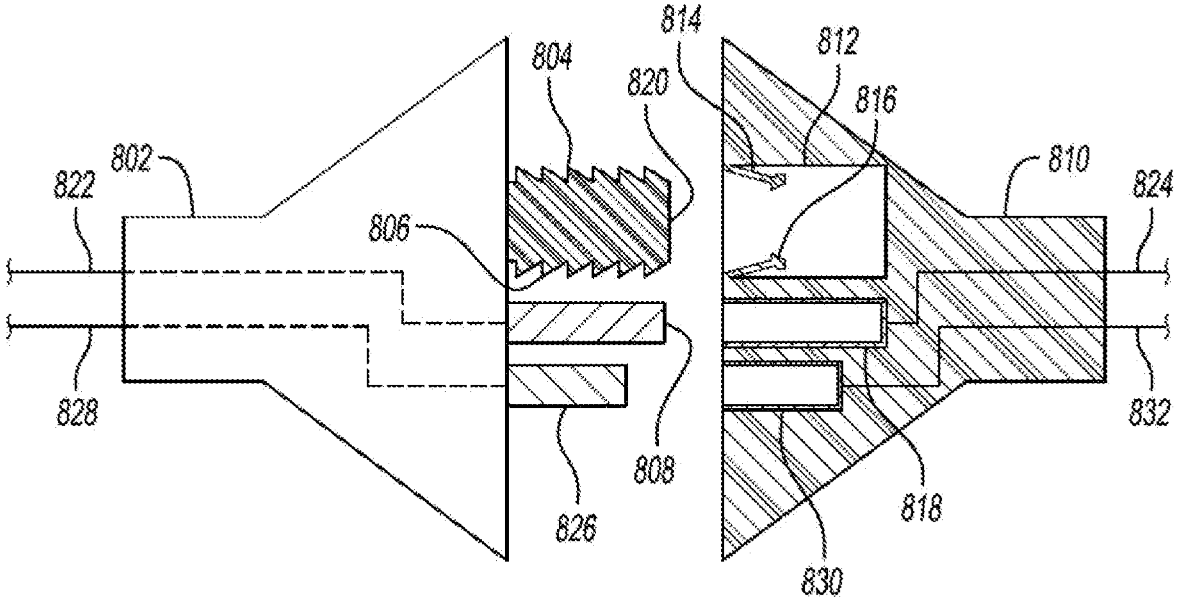
FIG. 8 shows an embodiment, in partial cross-section, wherein a male terminal is adjacent to a serrated insert and a female terminal is adjacent to a latch.

FIG. 8 shows an embodiment wherein an electrical pin is adjacent to a serrated insert and an electrical socket is adjacent to a latch. In FIG. 8, an electrical pin 808 is configured to be disposed within an electrical socket 818 by the insertion action of an electrical plug 802 toward an electrical receptacle 810. The electrical pin 808 is connected 822 to circuitry, to a power supply, or to ground. The electrical socket 818 is connected 824 to circuitry, to a power supply, or to ground. The electrical plug 802 also includes a serrated insert 820 with two sets of serrations 804, 806. The electrical receptacle 810 also includes two latches 814, 816 in a cavity 812 configured to receive the serrated insert 820. The two latches 814, 816 are further configured to ride along the serrations 804, 806, respectively. The electrical plug 802 also includes a detection pin 826 connected 828 to circuitry, to a power supply, or to ground. The electrical receptacle 810 also includes a detection socket 830 connected 832 to circuitry, to a power supply, or to ground. In this embodiment, the detection pin 826, which has a length less than the electrical pin 808, is disposed within the detection socket 830 only after the electrical pin 808 is disposed within the electrical socket 818. By this arrangement, the detection pin 826 and detection socket 830 can indicate whether the electrical pin 808 and electrical socket 818 have formed a connection. The embodiment of FIG. 8 demonstrates, among other things, that a serrated insert or a latch can be spaced away from the electrical pin or electrical socket, that multiple electrical connections may be established by one electrical plug and one electrical receptacle, and that electronic connection detection circuitry can be included in an electrical plug and an electrical receptacle.

Figure 9:
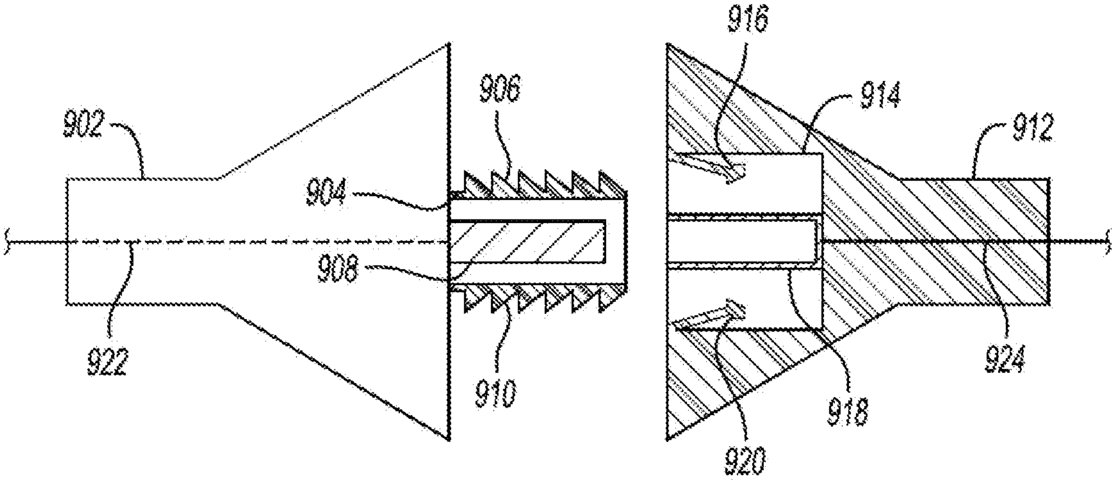
FIG. 9 shows an embodiment, in partial cross-section, wherein a male terminal is within a serrated insert.

FIG. 9 shows an embodiment wherein an electrical pin is disposed within a serrated insert. In FIG. 9, an electrical pin 908 is configured to be disposed within an electrical socket 918 in a recess 914 by the insertion action of an electrical plug 902 toward an electrical receptacle 912. The electrical pin 908 is connected 922 to circuitry, to a power supply, or to a ground. The electrical socket 908 is connected 922 to circuitry, to a power supply, or to ground. The electrical plug 902 also includes a serrated insert 904 with two sets of serrations 906, 910. The electrical receptacle 912 also includes two latches 916, 920 in the recess 914 configured to receive the serrated insert 904 and electrical pin 908. The two latches 916, 920 are further configured to ride along the serrations 906, 910, respectively. The embodiment of FIG. 9 demonstrates, among other things, that an electrical pin can be disposed within a serrated insert.

Additional embodiments can be constructed by interchanging the serrated insert with the recess configured to receive the serrated insert in both FIG. 8 and FIG. 9.

Although the first four figures show embodiments with rectangular and cylindrical cross-sections, an electrical connector could have any cross-sectional geometry. Although the connector shown in FIG. 3 and FIG. 4 includes five latches configured to ride along a single serrated insert, an electrical connector could have any number of latches or serrated inserts. At least one electrical connection that is established between a receptacle and a plug may be found within the connector or may be found adjacent to the connector. The terms receptacle and plug describe the relationship between the parts of the electrical connector assembly and should not be construed to impart any relationship on the electrical connections established thereby.

While exemplary embodiments are described above, it is not intended that these embodiments describe all possible forms encompassed by the claims. Other forms and variations are, of course, contemplated.

The words used in the specification are words of description rather than limitation, and it is understood that various changes may be made without departing from the spirit and scope of these disclosed materials. Some of the embodiments, for example, refer to pins and sockets. These, of course, are merely examples of male and female terminals, of which a variety of types may be used. Moreover, the terminals need not be male or female terminals: The terminals may be genderless (e.g., same).

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An electrical connection assembly comprising:

an electrical plug defining a serrated insert and including a terminal; and an electrical receptacle configured to receive the electrical plug, and including a second terminal and latches configured to, responsive to movement of the electrical plug toward the electrical receptacle resulting in movement of the terminal toward the second terminal, ride along serrations of the serrated insert such that (i) at least one of the latches and one of the serrations cooperate to resist disengagement of the electrical plug from the electrical receptacle and (ii) an extent to which the latches have ridden along the serrated insert corresponds to an extent to which the terminal and second terminal are engaged with each other.

2. The electrical connection assembly of claim 1, wherein the electrical plug further includes a detection terminal, and wherein the electrical receptacle further includes a second detection terminal, and wherein the terminal and detection terminal are configured such that, responsive to the movement of the electrical plug toward the electrical receptacle, the terminal engages the second terminal before the detection terminal engages the second detection terminal.

3. The electrical connection assembly of claim 2, wherein the detection terminal has a length less than the terminal.

4. The electrical connection assembly of claim 1, wherein the serrated insert is cantilevered from a body of the electrical plug.

5. The electrical connection assembly of claim 1, wherein an end of the serrated insert extends beyond an end of the electrical plug.

6. The electrical connection assembly of claim 1, wherein the serrations are formed around the serrated insert.

7. The electrical connection assembly of claim 1, wherein the latches are circumferentially disposed about an axis of the electrical receptacle.

8. The electrical connection assembly of claim 7, wherein the electrical plug and electrical receptacle are cylindrically shaped and wherein the axis is a center axis of the electrical receptacle.

9. The electrical connection assembly of claim 8, wherein the latches are disposed within a recess defined by a body of the electrical receptacle.

10. The electrical connection assembly of claim 8, wherein the serrated insert is disposed within a recess defined by a body of the electrical plug.

11. The electrical connection assembly of claim 1, wherein the at least one of the latches further includes a tab configured such that movement of the tab away from the serrated insert releases the at least one of the latches from the one of the serrations.

12. An electrical connection assembly comprising:

an electrical plug including a male terminal or a female terminal, and defining a plug body and a serrated insert cantilevered from the plug body; and an electrical receptacle including a second female terminal or a second male terminal, and defining a receptacle body configured to receive the plug body and a latch configured to, responsive to movement of the plug body into the receptacle body, ride along serrations of the serrated insert such that an extent to which the latch has ridden along the serrated insert corresponds to an extent to which the male terminal or female terminal is disposed within the second female terminal or second male terminal.

13. The electrical connection assembly of claim 12, wherein the latch is further configured such that the latch and one of the serrations cooperate to resist disengagement of the plug body from the receptacle body.

14. The electrical connection assembly of claim 12, wherein an end of the serrated insert extends beyond an end of the electrical plug.

15. The electrical connection assembly of claim 12, wherein the plug body and receptacle body are rectangularly shaped.

16. An electrical connection assembly comprising:

an electrical plug associated with a male terminal or a female terminal, and defining a recessed portion and a serrated insert disposed within and extending away from the recessed portion; and an electrical receptacle associated with a second female terminal or a second male terminal, and defining a plurality of latches disposed circumferentially about a center axis of the electrical receptacle such that, when the electrical plug is inserted into the electrical receptacle resulting in connection between (i) the male terminal or female terminal and (ii) the second female terminal or second male terminal, the latches surround and engage the serrated insert.

17. The electrical connection assembly of claim 16, wherein the electrical receptacle defines a recessed portion and the latches are disposed within the recessed portion of the electrical receptacle.

18. The electrical connection assembly of claim 16, wherein the latches and serrated insert are further configured such that the latches and serrated insert cooperate to resist disengagement of the electrical plug from the electrical receptacle.

19. The electrical connection assembly of claim 16, wherein the electrical plug and electrical receptacle are cylindrically shaped.

* * * * *